Patented Aug. 12, 1952

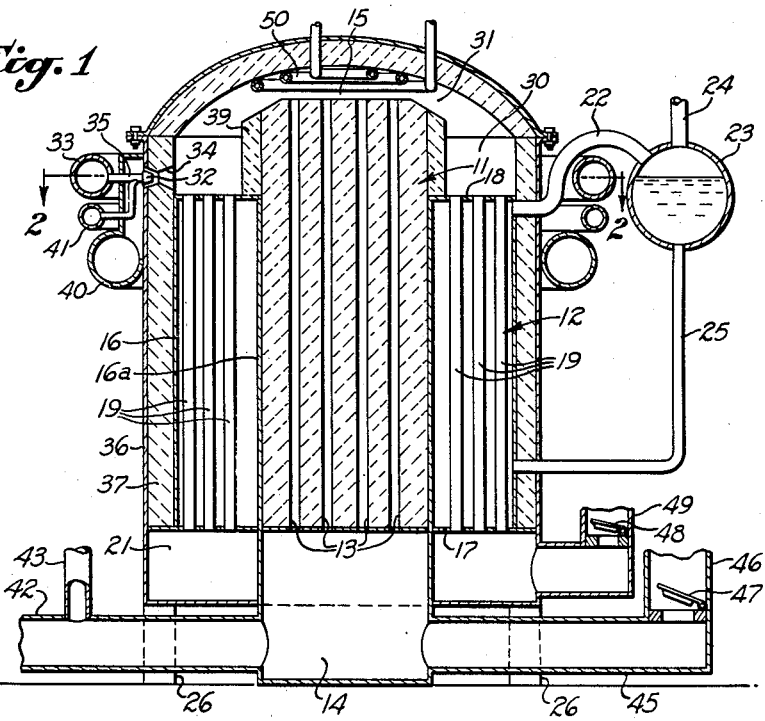
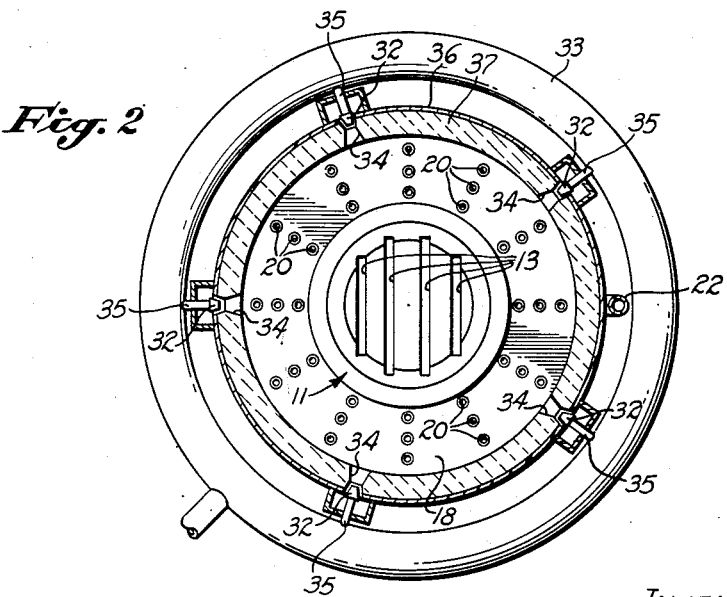

2,606,821

UNITED STATES PATENT OFFICE 2,606,821

FURNACE

Ford W. Harris, Los Angeles, Calif., assignor to Wulff Process Company, Huntington Park, Calif., a corporation of California Application February 24, 1947, Serial No. 730,642

4 Claims. (Cl. 23—277)

My invention relates to regenerative furnaces, that is, to furnaces containing a regenerative mass which is first heated by passing hot combustion products therethrough, and which is then used to heat gases that are passed therethrough, the heat stored in the mass being given up to the gases so heated. The furnace is particularly designed to process gases which must be very quickly heated to a high temperature and very quickly cooled after reaching the desired maximum temperature; for example, it is designed for use in processes in which acetylene is made from methane. A furnace for this purpose must be not only a furnace in which the methane is heated as near the highest temperature to which the furnace lining, such, for example, as carborundum, may be heated, for example, to 3000° F., but the furnace must provide that the methane be heated in as short a time as is practicable, for example, $\frac{1}{10}$ second or preferably less, and be as quickly cooled as is practicable, to a temperature at which the acetylene is stable, for example, to 900° F.

It is an object of my invention to provide a furnace capable of producing acetylene in the manner above described. Such a furnace has other uses, the manufacture of acetylene from methane being given to illustrate only one use of my invention.

In any furnace of this type, in which a mass of carborundum or other heat-refractory substance is held at temperatures in excess of 2800° F. for considerable periods, the problem of supporting the incandescent mass of carborundum is a troublesome one, and it is a further object of the invention to provide means for raising the temperature of certain portions of the regenerative mass to a temperature higher than the maximum temperature to which it is desired to heat the gases to be processed, for example, to a maximum temperature of 3000° F., and to provide a construction which will permit the cooler portion of the regenerative mass to be supported on steel supports in such a manner that these supports will not be weakened by high temperatures.

It is a further object of my invention to provide in such a furnace means for recovering and putting to practical use a considerable portion of the heat used to heat the gas to a high enough temperature to produce the desired change in the gas being used as raw material, for example, in converting methane to acetylene.

It is a further object of my invention to provide a furnace which may be operated on a recurrent cycle in which the regenerative mass, after having been brought up to the maximum temperature that can be maintained without too rapid deterioration of the regenerative mass, is subjected to a recurrent cycle consisting of a treating period, in which the gas to be treated, for example, methane or a mixture of gases containing methane, passes in one direction through passages in said mass, thus reducing the temperature of the mass; a heating period during which high temperature gases, usually products of combustion, are passed through said passages for a sufficient period to restore the mass to the maximum temperature; and a purging period during which the interior of the furnace is cleared of products of combustion before the cycle is repeated.

It is a further object of my invention to provide a furnace which may be operated on a cycle as above described in such a manner that no portion of the regenerative mass is subjected to excessive changes in pressure during said cycle. Such changes in pressure are destructive to regenerative material and should not be in excess of 5 pounds per square inch. If, for example, any portion of the regenerative mass is never at an absolute pressure below 16 pounds per square inch, that portion of the mass should never be subjected to an absolute pressure in excess of 21 pounds per square inch.

It is a further object of my invention to provide a furnace structure which will allow rapid purging of the interior of the furnace at the conclusion of the heating period so that hot combustion gases left in the passages in the mass at the end of the heating period are not carried over with and do not contaminate the gas heated during the treating period.

It is a further object of my invention to produce a furnace of compact structure in which the regenerative mass and cooling means are contained efficiently within a single insulated unit, such furnace having a minimum of supporting members and avoiding the necessity of carrying the supporting structure to a high elevation.

It is a further object of my invention to provide such a furnace in which a boiler is used as a means for cooling the products of the heating period and in which the tubes of the regenerative mass are accessible from the top of the furnace without disturbing the boiler and the tubes of the boiler are accessible from the top of the furnace without disturbing the regenerative mass.

It is a further object of my invention to produce a furnace which will operate over long periods without need of repairs, and in which the productive capacity is high as compared with the bulk and cost of the furnace.

Further objects and advantages will be made evident hereinafter.

Referring to the drawing, in which I illustrate a preferred form of furnace embodying my invention:

Fig. 1 is a vertical cross section through the furnace, shown somewhat schematically, various valves, pumps, etc., ordinarily used with the furnace but readily supplied by one skilled in the art, being omitted; and Fig. 2 is a section through the boiler shown in Fig. 1, this section being viewed in the direction of the arrows adjoining the line 2—2 of Fig. 1, this line identifying the horizontal plane of the section shown in Fig. 2.

The preferred form of furnace shown in the drawing includes a regenerative mass 11 in vertical cylindrical form, surrounding which is an annular heat exchanger 12. The regenerative mass 11 may be formed of loose carborundum bricks so placed as to provide vertical, substantially straight, and open primary passages 13 which extend through the mass 11 and connect a primary space 14 below the mass with a secondary space 15 above the mass. The heat exchanger 12 is of the fire tube boiler type consisting of two cylindrical concentric steel shells 16 and 16a, the inner shell 16a confining the regenerative mass 11. The concentric cylinders 16 and 16a are joined at the upper end by an upper head 18 and at the lower end by a lower head 17. Secured at their lower ends in the lower head 17 and at their upper ends in the upper head 18 are a series of tubes 19. Below the lower head 17 and annular to the primary space 14 is a tertiary space 21 which is connected to a combustion chamber 30 by means of open passages 29 inside the tubes 19. The space inside the shell 16 around the tubes 19 is kept filled with water. Water flows through a pipe 22 to a steam drum 23 in which the steam separates from the water. The usual boiler feed devices are provided, but not shown, to keep the inside of the heat exchanger partly full of water at all times as the water is boiled away in the form of steam. Steam is taken from the drum 23 through a pipe 24, and, due to thermo-siphon and gravity action, water flows from the drum 23 through a pipe 25 back into the shell 16 near its lower end.

For convenience in illustration, the passages 13 and tubes 19 are somewhat simplified in the drawing, being much more numerous and of greater area in proportion to the diameters of the mass 11 and the heat exchanger 12 in the actual furnace than they are shown in the drawing.

Surrounding the upper end of the regenerative mass 11 is the annular combustion chamber 30, which is in communication with the secondary space 15 through an uninterrupted throat 31. Combustion in this space is provided by a plurality of burners 32, for example five, each fed with gas from a fuel manifold 33. The combustion products in the space 15 may have a temperature of 3200–3400° F. The burners 32 discharge through openings 34 in the side wall of the combustion space 30, with a pipe 35 forming part of each burner. Air is supplied to the burners 32 from an air manifold 40, and steam is admitted into the burners 32 from a steam manifold 41.

Surrounding the heat exchanger 12 and the combustion chamber 30, and lining the roof of the furnace above the secondary space 15, is a layer of heat insulating material 37 within an outer steel shell 36. Surrounding the upper end of the regenerative mass 11 is a ring of carborundum 39, and above the regenerative mass beneath the roof of the furnace is a spiral water tube cooling element 50.

I prefer to line the inside of the combustion chamber 30 with carborundum brick, but it should be understood that carborundum is merely a preferred refractory material and whereever I have specified its use any refractory material having satisfactory characteristics may be used. In fact, in actual furnace construction I do not use carborundum as the material for the annular layer 37, in which only a low thermal conductivity is desirable.

The primary space 14 is provided with an inlet pipe 42 through which the gas to be processed may be supplied to the space 14, and steam or other inert diluent gas may be supplied to the primary space 14 through a pipe 43. The pipes 42 and 43 are provided with valves, as are the pipes that supply fuel gas to the pipes 35, and as is the pipe supplying steam to the burners 32, these valves also not being shown. The primary space 14 also has an outlet pipe 45 through which combustion gases are conducted to a stack 46 through a valve 47. Processed gases are taken from the tertiary space 21 through a valve 48 to a pipe 49, these gases being the product desired.

The furnace may be supported on that portion of the outer shell 36 which forms the base of the primary space 14, secured with steel supports 26 running from the base plate of the tertiary space 21 to suitable footings. The spaces 14 and 21, as will be understood from the description appearing later herein, never contain gas at a temperature which will substantially impair the strength of steel.

The operation of the furnace may be manually controlled by operating the various valves, but in practice these valves are automatically controlled by mechanism forming no part of the furnace and hence not described or shown.

The operation in producing acetylene from methane will be described, as such an operation is typical of many uses for which the furnace may be utilized. The furnace is operated in a periodically recurring cycle consisting of a heating, a purging, and a treating period. At the beginning of the heating period, the valve 48 is closed, and the valve 47 is open, and during this heating period no gas or diluent is supplied to the primary space 14 through the pipe 42.

Fuel gas is supplied to the burners 32 from the manifold 33, and air for combustion is supplied from the manifold 40. It is important to so regulate the flow of air and gas that each of the burners will produce combustion products of about the same volume and at about the same temperature. In the drawing, I show five burners 32, but in large furnaces more than five burners are desirable. The burners may be inserted through the side walls of the combustion chamber 30, their exact location and number being such as to provide even distribution of heat and control of temperature throughout the combustion chamber. I have found that in a properly designed furnace a heat liberation of 750,000 to 1,000,000 B. t. u. per hour for each cubic foot of combustion space is possible. This ring of combustion products surrounds the upper end of the ring 39 and tends to heat it. The combustion products flow evenly through the throat 31, which is constricted to an area perpendicular to the gas flow of at least ⅓ of the area on a horizontal plane of the combustion space 30. This constriction tends to promote an even flow of combustion products through the throat 31. Combustion products flow through the throat at a rather uniform velocity and temperature all around the throat, and this velocity is lowered in the space 15 before the gases change direction and flow downwardly through the primary passages 13. The changes in velocity and direction of the combustion gases in passing from the combustion chamber 30 to the space 15 tend to mix the gases and produce a very uniform temperature of the gases entering each of the passages 13, which is highly desirable, as it is my purpose to uniformly heat the regenerative mass to the maximum temperature at which it can be used in practice.

Carborundum stands up well at temperatures materially below 3000° F., but deteriorates rapidly at temperatures materially above 3000° F. I prefer to operate the furnace so that no portion of the regenerative mass is at a temperature above 3000° F., in order to prevent rapid deterioration of the carborundum, and to operate as close as is practicable to this temperature in order to improve the degree of conversion of the methane to acetylene. A uniform heating of the mass 11 can only be accomplished by uniformity of temperature of the combustion products in the combustion chamber 30 and a uniform flow of gases through the throat 31. Overheating of the upper portion of the regenerative mass is avoided by use of the cooling unit 50 which may be employed to absorb excess heat from the top of the regenerative mass.

The primary passages 13 should be of such size, and the volume of the combustion products should be such, that the combustion products passing downwardly through the primary passages attain a high velocity, preferably in excess of 10,000 feet a minute. These products lose heat rapidly by convection; in fact, I have found that in a properly designed and operated furnace the combustion products lose about 80% of their sensible heat to the regenerative mass 11 in their passage from the throat 31 to the primary space 14. The products of combustion are drawn from the primary space 14 through the pipe 45 and valve 47 into the stack 46, which provides a draft, thereby aiding in withdrawing the products of combustion from the system. The regenerative mass 11 should be of sufficient length to insure a temperature at the bottom of the mass of about 900° F. when the top of the mass is at 3000° F., and when the mass reaches these temperatures the firing period terminates and the flow of gas to the burners 32 from the manifold 33 and the flow of air to the burners 32 are both shut off. This firing period, when the furnace is operating on the cycle, may be from one to two minutes.

The purging period, which may require three seconds, then occurs. The valve 47 is open and the valve 48 is closed at the end of the heating period. Steam or other purging agent is admitted to the burners 32 from the pipe 41 and flows upwardly through the throat 31 and the secondary space 15, thence downwardly through the primary passages 13 to the primary space 14, and through the valve 47 to the pipe 46. This flow purges the primary passages 13 and combustion chamber 30 of combustion products During the treating period, the gas to be treated, for example, a mixture containing methane, is delivered to the primary space 14 from the pipe 42 and flows upwardly through the primary passages 13, being heated by contact with the hot regenerative mass. In making acetylene, I prefer not to heat the methane mixture before it enters the primary space 14. In its passage upwardly through the primary passages, the mixture is heated to a temperature of about 2800° F. At or perhaps below this temperature, the methane is converted into acetylene, hydrogen being released. This reaction absorbs large quantities of heat which is obtained from the regenerative mass 11. At this high temperature the reaction is very rapid, taking not more than $\frac{1}{10}$ second, and it is important that the flow of gas should be such that the gas passes through the upper 10% of the regenerative mass in considerably less than $\frac{1}{10}$ second.

Acetylene is quite unstable, and it is important that the converted products of the primary passages be cooled quickly; this cooling is accomplished in the tubes 19 of the heat exchanger 12. The heat exchange tubes 19 should be so proportioned that the gases are cooled to about 900° F. in their passage through these tubes, and that the time required should be $\frac{1}{10}$ second, or less. This quick cooling can be secured if the heat exchange surface, that is, the area of the internal surface of the tubes 19, is from 0.2 to 0.4 times the area of the walls of the primary passages 13, and the mass velocity of the cracked gas and steam mixture passing through the tubes is from 3 to 6 pounds per square foot of the tube cross section per second. It is not advisable to cool the gas much below 900° F. in the cooler 12, as at lower temperatures any tars carried in the gases tend to condense and collect carbon, thus blocking the tubes. This tar and carbon can be removed in a scrubber after the gas leaves the pipe 49. The treating period continues until the regenerative mass 11 cools to such a degrees that it is not highly efficient in its conversion of methane to acetylene, when the treating period ends by shutting off the flow of the methane mixture into the primary space 14, by shutting off the flow of steam into the burners 32, and by opening the valve 47 and closing the valve 48. The cycle is then complete, and the firing period of the next cycle starts. The treating period may have been about one minute.

While I have described the use of my furnace in relation to producing acetylene from methane, it may be also used to produce butadiene and the olefins, such as ethylene, propylene, and butylene, or the aromatics, such as benzene, toluene, and xylene, or hydrocyanic acid from the reaction of hydrocarbons and ammonia. All of these products are endothermic in nature, and the speed of formation is very rapid at high temperature. All of these products are also unstable at high temperatures and must be quickly cooled if they are to be preserved against disintegration. To successfully produce and preserve each of these other products, they must be held at formation temperatures no longer than a fraction of a second.

While I have described my furnace as using methane as a gas to be processed, in practice it will be more often used to process natural gas, which is largely methane, waste hydrocarbon gases from oil refineries or other sources which may or may not contain methane but contain other hydrocarbons such as ethane, butane, propane, or the like, or natural gasoline or other petroleum derivatives which are liquid at normal temperatures and which must be gasified by heating prior to being delivered to the primary space 14.

In any consideration of the furnace, it should be understood that the heat exchanger not only acts as a very efficient means for quickly extracting heat from the gas after this gas leaves the regenerative mass, but that it also acts as a steam boiler, producing steam. This function is of considerable value, as steam finds a ready use in connection with the plant in which any such furnace is operated.

The general dimensions of the regenerative mass in regard to the dimensions of the primary passages therethrough and the thickness of the walls therebetween may be those set forth in the Hasche et al. Patents No. 2,318,688, issued May 11, 1943, and No. 2,319,679, issued May 18, 1943.

Quantitative statements as given above, in so far as they depend upon any definite size of furnace, relate to a furnace having a regenerative mass with a diameter of 6½ feet, a length of 15 feet, a total surface of primary regenerative passageway of approximately 8000 square feet, a volume of total primary passageway of regenerative mass of approximately 115 cubic feet, and having a steam boiler with a total tube surface of approximately 2400 square feet. In such a furnace the lineal velocity of gas through the tubes should be 20,000 to 30,000 feet per minute.

To obtain the best results, the area of the walls of the primary passages should be approximately equal to the area of the walls of the secondary passages, and the total cubical volume of the space included in the secondary space and the secondary passages should not be over twice the volume of the space included in the primary passages.

I claim as my invention:

1. In a furnace, a new and useful combination of the following named elements associated as hereinafter stated, namely: an inner steel shell forming a first lower enclosed space; an outer shell forming a second upper enclosed space; a regenerative mass having channels so placed as to connect said first lower enclosed space with said second upper enclosed space, said regenerative mass being placed above said first lower enclosed space and projecting into said upper enclosed space and having a plurality of primary passages therein so placed that gas may flow therethrough from said first lower enclosed space to said second upper enclosed space; walls forming a third enclosed space surrounding said first lower enclosed space; walls forming a water space surrounding said regenerative mass; and tubes passing through said water space, said tubes being so placed as to allow gases to flow from said second enclosed space to said third enclosed space.

2. The combination as claimed in claim 1 to which are added: a first lower valved conduit through which a gas may be delivered to said first lower enclosed space; and a second lower valved conduit through which gas may be taken from said first lower enclosed space.

3. In a furnace, a new and useful combination of the following named elements associated as hereinafter stated, namely: an inner steel shell forming a first lower enclosed space; an outer shell forming a second upper enclosed space; a regenerative mass having channels so placed as to connect said first lower enclosed space with said second upper enclosed space, said regenerative mass being placed above said first lower enclosed space and projecting into said second upper enclosed space and having a plurality of primary passages therein so placed that gas may flow therethrough from said first lower enclosed space to said second upper enclosed space; walls forming a third enclosed space surrounding said first lower enclosed space; walls forming a water space surrounding said regenerative mass; tubes passing through said water space, said tubes being so placed as to allow gases to flow from said second enclosed space to said third enclosed space; a first valved pipe so placed as to deliver fuel gas to said second upper enclosed space; and a second valved pipe so placed as to deliver oxygen to said second upper enclosed space.

4. In a furnace, a new and useful combination of the following named elements associated as hereinafter stated, namely: an inner steel shell forming a first lower enclosed space; an outer shell forming a second upper enclosed space; a regenerative mass having channels so placed as to connect said first lower enclosed space with said second upper enclosed space, said regenerative mass being placed above said first lower enclosed space and projecting into said second upper enclosed space and having a pluraltiy of primary passages therein so placed that gas may flow therethrough from said first lower enclosed space to said second upper enclosed space; walls forming a third enclosed space surrounding said first lower enclosed space; walls forming a water space surrounding said regenerative mass; tubes passing through said water space, said tubes being so placed as to allow gases to flow from said second enclosed space to said third enclosed space; a first lower valved conduit through which a gas may be delivered to said first lower enclosed space; a second lower valved conduit through which gas may be taken from said first lower enclosed space; a first valved pipe so placed as to deliver a fuel gas to said second upper enclosed space; and a second valved pipe so placed as to deliver oxygen to said second upper enclosed space.

FORD W. HARRIS.

REFERENCES CITED

The following references are of record in the file of this patent:

UNITED STATES PATENTS

| Number | Name | Date |
|---|---|---|
| 103,651 | Player | May 31, 1870 |
| 2,164,762 | Baumann et al. | July 4, 1939 |
| 2,432,885 | Hasche | Dec. 16, 1947 |
| 2,442,460 | Hasche | June 1, 1948 |

FOREIGN PATENTS

| Number | Country | Date |
|---|---|---|
| 11,853 | Great Britain | June 7, 1899 |
| 593,153 | France | Aug. 18, 1925 |